Lenox & Spaulding.
Potato Digger.

Nº 64,114. Patented Apr. 23, 1867.

Witnesses;
Theo Tusche
Wm Trewrn

Inventor;
E. S. Lenox
E. Spaulding
Per Munn
Attorneys

United States Patent Office.

EDWARD S. LENOX AND EDWARD SPAULDING, OF NEW YORK, N. Y.

Letters Patent No. 64,114, dated April 23, 1867.

---

POTATO-DIGGER.

---

The Schedule referred to in these Letters Patent and making part of the same.

---

TO ALL WHOM IT MAY CONCERN:

Be it known that we, E. S. LENOX and EDWARD SPAULDING, of the city, county, and State of New York, have invented a new and improved Potato-Digger; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a potato-digger, the scoop of which is provided with flaring wings, so that a broad, wide track is made, which facilitates the separation of the potatoes from the dirt. The sides or wings extend beyond the front edge of the scoop, and the cutting edge of the latter is V-shaped, or concave, with a projecting extension in the centre, so that the scoop begins to cut at its sides, whereby the bursting of the hill is avoided. To the rear edge of said scoop is hinged a grate or riddle, formed of sheet-metal bars, to which a vibrating motion is imparted by suitable gearing, in such a manner that the dirt and potatoes raised by the action of the scoop are readily separated by the action of the grate, and the potatoes can then be easily collected.

Figure 1:
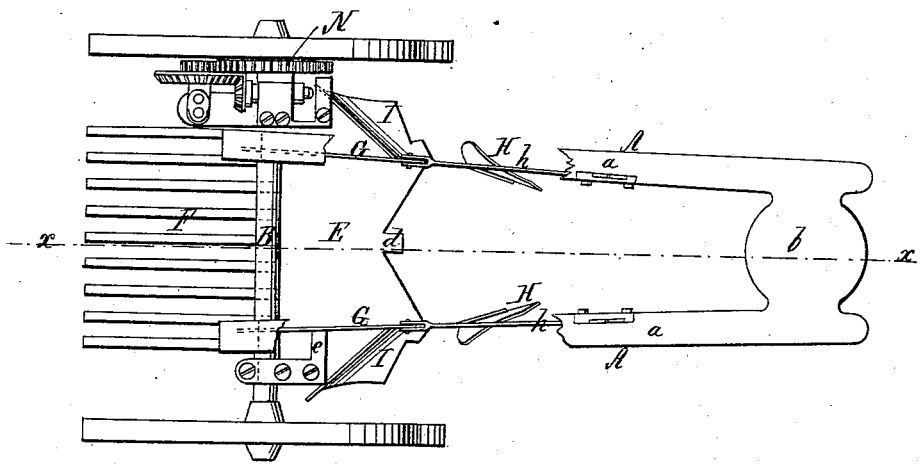
Figure 1 represents a plan or top view, partly in section, of our improved potato-digger.
Figure 2:
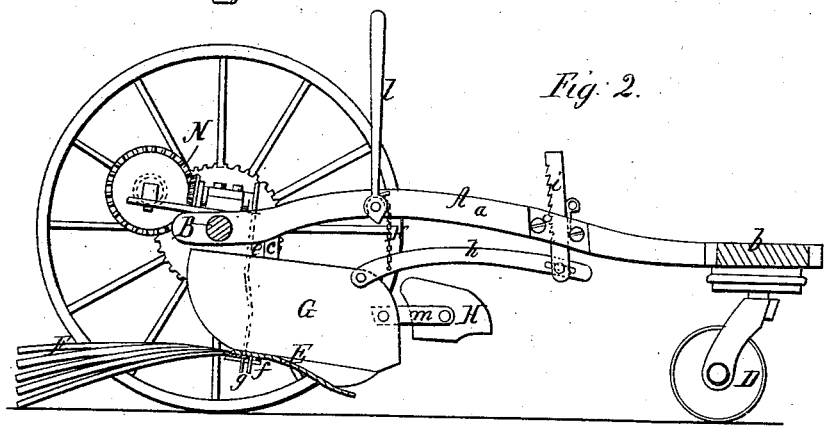
Figure 2 is a vertical longitudinal section of the same, taken on the line $x\,x$, fig. 1.
Figure 3:
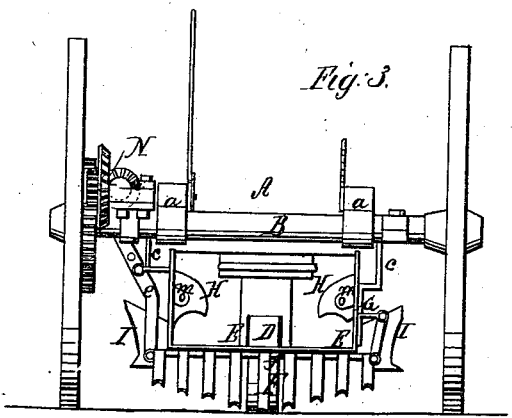
Figure 3 is an end elevation of the same.

A represents a frame, consisting of two longitudinal bars $a$, which are connected in front by a brace, $b$, and in rear by the axle B of the rear supporting-wheels C, as is clearly shown in the drawings. In front the frame is supported by a broad-faced caster-wheel, D, which presses the ground down in front of the scoop E, so that the same is easily taken up. The scoop E is suspended from the axle B by the rods $c$, and its front or cutting edge is made concave or V-shaped, as is seen more particularly in fig. 1. In the centre of the cutting edge is a small projecting portion, $d$, as shown. To the rear end of this scoop is pivoted a riddle, F, to which a vibrating motion is imparted by suitable gearing N, or other devices, which give oscillating motion to a connecting-rod, $e$, by which the motion is transferred to the riddle. The bars of this riddle are made of sheet metal, and the edges bent down, as shown in fig. 3, to increase the strength. The centre bars are made so that their extreme ends drag or rest on the ground, and form a fulcrum, around which the grate swings, causing the motion of each grate-bar to decrease from its front end towards the point. The side-bars of the grate are bent up, so that the whole forms a kind of a trough, whereby the potatoes are deposited in the centre of the furrow, and can then be easily collected. In front, the ends of the bars of the grate are connected by a cross-bar, $f$, which is slotted, and is guided by pins or bolts $g$, which are attached to the under side of the scoop E. The side wings G G of the scoop, which are almost perfectly vertical, project in front of the cutting edge of the scoop, as shown in fig. 2, so as to cut the ground before it is taken up by the scoop, thus determining the exact quantity of soil to be raised by the scoop, and also preventing the soil from bursting or falling to pieces before being elevated. In order to prevent the unnecessary raising of such ground, in which no potatoes can be contained, cutters H have been arranged in front of the wings G, and are attached to the same by means of braces $m$, inclining somewhat towards each other, so as to level off the ridge and to reduce the quantity of dirt that is elevated by the scoop. On the outside of each wing G is arranged a mould-board, I, which continues the operation of the cutter H, and widens the track of the machine, whereby we are enabled to construct the riddle E of greater width than the scoop. The easy operation of the whole apparatus is thus insured. The scoop is suspended in front by two bars $h\,h$, each of which is pivoted to one of the wings G and to the lower end of a vertical bar, $i$, which is either notched or otherwise made adjustable up and down, and which is held in the side bars of the frame A, as shown. A chain, $k$, attached to one of the bars $h$, and to the lower end of a lever, $l$, which is pivoted to the frame A, may be used for raising the front or cutting edge of the scoop more or less, as may be desired. By lowering the bars $i$, the front of the scoop will be lowered permanently, while the lever $l$ may be applied for temporarily adjusting the position of the scoop.

We claim as new, and desire to secure by Letters Patent—

1. The potato-digger, consisting of the frame A, secured to the axle B, caster-wheel D, suspended scoop E, with wings G G, curved bars $h$, riddle F, vibrated by suitable gearing N, cutters H, mould-board I, toothed vertical bar $i$, chain $k$, and lever $l$, constructed and operating substantially as herein shown and described.

2. The scoop E, when provided with a concave cutting edge, to prevent the bursting of the hill, in combination with the wings G, as set forth.

3. The vibrating riddle F, consisting of bent sheet-metal bars, which are so arranged that the ends of the centre bars drag on the ground, and those of the outer bars are elevated above the ground, substantially as and for the purpose herein shown and described, in combination with the mould-boards H and I, substantially as herein set forth.

4. The mould-boards H and I, when arranged as described, in combination with the wings G and scoop E, all made and operating substantially as and for the purpose herein shown and described.

5. Extending the sides or wings G beyond the bottom of the scoop E, substantially as and for the purpose herein shown and described.

EDW. S. LENOX,
EDWD. SPAULDING.

Witnesses:
   WM. F. McNAMARA,
   ALEX. F. ROBERTS.